US007222086B2

(12) United States Patent
Huffman (10) Patent No.: US 7,222,086 B2
(45) Date of Patent: May 22, 2007

(54) SYSTEMS AND METHODS FOR PROVIDING PERFORMANCE FEEDBACK TO A CASHIER AT A POINT-OF-SALE TERMINAL

(75) Inventor: Jackie L. Huffman, Alpharetta, GA (US)

(73) Assignee: NCR Corp., Dayton, OH (US)

( * ) Notice: Subject to any disclaimer, the term of this patent is extended or adjusted under 35 U.S.C. 154(b) by 1471 days.

(21) Appl. No.: 09/847,794

(22) Filed: May 2, 2001

(65) Prior Publication Data
US 2002/0178048 A1    Nov. 28, 2002

(51) Int. Cl.
*G06F 11/34* (2006.01)
(52) U.S. Cl. ....................................................... 705/11
(58) Field of Classification Search ................. 705/10, 705/11
See application file for complete search history.

(56) References Cited

U.S. PATENT DOCUMENTS

| | | | | |
|---|---|---|---|---|
| 3,675,204 A | | 7/1972 | Miehle et al. .......... 340/147 R |
| 3,899,775 A | * | 8/1975 | Larsen ......................... 705/21 |
| 4,413,277 A | | 11/1983 | Murray ........................ 358/93 |
| 4,819,162 A | * | 4/1989 | Webb et al. .................... 705/32 |
| 4,930,093 A | * | 5/1990 | Houser et al. .............. 702/186 |
| 5,068,787 A | * | 11/1991 | Pipella et al. ................. 705/32 |
| 5,121,319 A | * | 6/1992 | Fath et al. ...................... 700/83 |
| 5,172,313 A | | 12/1992 | Schumacher ................ 364/401 |
| 5,212,635 A | | 5/1993 | Ferriter ........................ 364/402 |
| 5,239,460 A | | 8/1993 | LaRoche ..................... 364/401 |
| 5,355,327 A | * | 10/1994 | Stent et al. .................. 702/187 |
| 5,444,226 A | * | 8/1995 | Collins, Jr. ............. 235/462.01 |
| 5,535,256 A | * | 7/1996 | Maloney et al. ............. 379/309 |
| 5,623,404 A | | 4/1997 | Collins et al. ............... 395/209 |
| 5,684,964 A | | 11/1997 | Powers et al. .............. 395/211 |
| 5,726,914 A | * | 3/1998 | Janovski et al. .............. 702/84 |
| 5,826,240 A | | 10/1998 | Brockman et al. ............ 705/11 |
| 5,864,616 A | * | 1/1999 | Hartmeier .............. 379/265.03 |
| 5,956,695 A | | 9/1999 | Carrithers et al. ............ 705/14 |

(Continued)

FOREIGN PATENT DOCUMENTS

GB        2306025        *    4/1997

(Continued)

OTHER PUBLICATIONS

Grant, Rebecca et al., Monitoring Service Workers via Computer: The Effect on Employees, Productivity, and Service National Productivity Review, Spring 1987, vol. 8, No. 2.*

(Continued)

*Primary Examiner*—Tariq R. Hafiz
*Assistant Examiner*—Scott L. Jarrett
(74) *Attorney, Agent, or Firm*—Priest & Goldstein PLLC (57) ABSTRACT

A system is described for providing performance feedback to a cashier at a POS terminal. The system includes a display for displaying information to a cashier operating the POS terminal. The display displays a performance goal screen at the start of a work session, indicating to the cashier a performance goal for the work session. The POS terminal measures the cashier's performance during the work session and, at the end of the work session, the display displays a performance report screen comparing the cashier's measured performance with the performance goal.

18 Claims, 5 Drawing Sheets

U.S. PATENT DOCUMENTS

| | | | | |
|---|---|---|---|---|
| 5,980,429 | A | 11/1999 | Nashner | 482/8 |
| 6,047,261 | A * | 4/2000 | Siefert | 705/11 |
| 6,049,779 | A * | 4/2000 | Berkson | 705/14 |
| 6,735,574 | B2 * | 5/2004 | Bull | 705/32 |
| 6,792,394 | B1 * | 9/2004 | Matsko et al. | 702/187 |
| 6,857,567 | B2 * | 2/2005 | Latimer et al. | 235/383 |
| 6,871,185 | B2 * | 3/2005 | Walker et al. | 705/16 |
| 6,871,195 | B2 * | 3/2005 | Ryan et al. | 706/46 |
| 6,970,810 | B1 * | 11/2005 | Matsko | 702/187 |
| 7,093,748 | B1 * | 8/2006 | Matsko et al. | 235/377 |
| 7,181,413 | B2 * | 2/2007 | Hadden et al. | 705/11 |
| 2001/0032120 | A1 * | 10/2001 | Stuart et al. | 705/11 |
| 2001/0056367 | A1 * | 12/2001 | Herbert et al. | 705/11 |
| 2005/0038695 | A1 * | 2/2005 | Matsko | 705/10 |

FOREIGN PATENT DOCUMENTS

| | | | |
|---|---|---|---|
| GB | WO 97/13229 | * | 7/1997 |
| WO | WO 02/27571 A2 | * | 4/2002 |

OTHER PUBLICATIONS

Zimmerman, Dennis, Nieman set to expand computer-based training Supermarket News, Apr. 22, 1996, vol. 46, No. 17.*

Closing in on front-end shrink Progressive Grocer, May 1996, vol. 75, No. 5.*

Fitzpatrick, Michael J., Measuring Productivity with Employee Task Charts American Agent & Broker, vol. 60, No. 10, Oct. 1988, pp. 88, 90.*

Meyer, Christopher, How the Right Measures Helps Teams Excel Harvard Business Review, vol. 72, No. 3, May-Jun. 1994, pp. 95-103.*

Grant, Rebecca et al., Computerized Performance Monitors as Multidimensional Systems ACM Transactions on Information SYstems, vol. 14, No. 2, Apr. 1996, pp. 212-235.*

Lean Manufacturing Principles Improve Production Metal Forming Magazin, Jun. 1996.*

Stansfield, Timothy Char,es, The effects of feedback and goal setting on manufacturing productivity improvement The University of Toledo, 1997, AAT 9816873.*

Kaydos, Will, Operational Performance Measurement CRC Press, 1999, ISBN: 1-57444-099-3.*

* cited by examiner

| EMPLOYEE ID NO. | GOAL | NUMBER OF ITEMS SCANNED/MIN. | |
|---|---|---|---|
| | | YTD | 6/1/2000 |
| 1 | 25 | 21 | 19 |
| 2 | 25 | 19 | 20 |
| 3 | 15 | 10 | 12 |
| 4 | 15 | 12 | 18 |
| 5 | 20 | 18 | 18 |
| 6 | 25 | 30 | 31 |

FIG. 3

Log On
NCR  Enter your ID number

ID: ☐

ID:
Password:

Total: 0.00

Terminal: 100　　Training Mode　　07/29/99
Status: Offline　　　　　　　　　3:18 PM

SYSTEMS AND METHODS FOR PROVIDING PERFORMANCE FEEDBACK TO A CASHIER AT A POINT-OF-SALE TERMINAL

BACKGROUND OF THE INVENTION

1. Field of the Invention

The present invention relates generally to systems and methods for motivating employees, and more particularly to advantageous aspects of systems and methods for providing performance feedback to a cashier at a point-of-sale (POS) terminal.

2. Description of the Prior Art

It is known that one way to motivate employees to perform their tasks as efficiently as possible is to provide them with ongoing feedback as to their level of performance. In a retail store, one important task having a direct impact on customer satisfaction is the speed and accuracy with which the checkout process is accomplished. However, cashiers using POS terminals currently do not get immediate feedback on their performance. Thus, providing cashiers with this feedback may motivate them to work faster.

SUMMARY OF THE INVENTION

The above-described issues and others are addressed by the present invention, one aspect of which is directed to a system for providing feedback to a cashier at a POS terminal. The system includes a display for displaying information to a cashier operating the POS terminal. The display displays a performance goal screen at the start of a work session, indicating to the cashier a performance goal for the work session. The POS terminal measures the cashier's performance during the work session and, at the end of the work session, the display displays a performance report screen comparing the cashier's measured performance with the performance goal.

Additional features and advantages of the present invention will become apparent by reference to the following detailed description and accompanying drawings.

DETAILED DESCRIPTION

Cashiers using point of service (POS) terminals currently get no immediate feedback on their performance. A first aspect of the present invention provides a system called the POS performance motivator that helps cashiers perform to the best of their ability by giving them a goal, and then comparing their actual performance to their goal. In addition to motivating cashiers, the POS performance motivator also helps retail businesses to increase productivity and sales. In typical POS applications that monitor cashier performance, the performance information is only available to managers in the form of reports. Unlike these report-based POS applications, the present invention provides immediate feedback to cashiers. Immediate feedback can be an important tool for motivating employees and helping them to become more productive.

Figure 1:
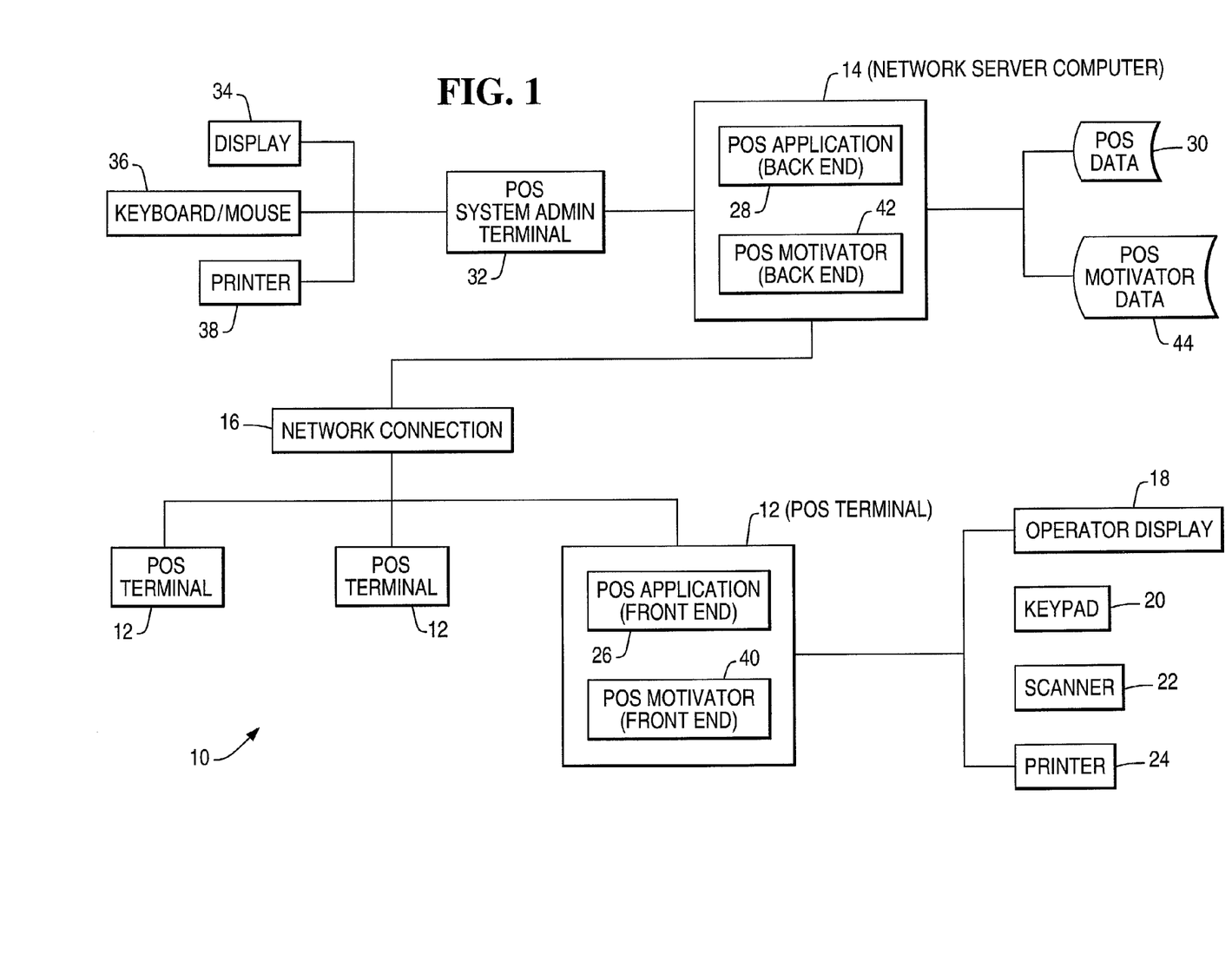
FIG. 1 shows a diagram of a system for motivating cashiers using networked POS terminals according to a first aspect of the present invention.

FIG. 1 shows a diagram of a POS performance motivator system 10 according to a first aspect of the present invention. According to this aspect of the invention, the POS performance motivator 10 is implemented in a network configuration, in which a network of POS terminals 12 is connected to a central server computer 14. The network connection 16 may be local or may, if desired, be implemented using the Internet.

Each POS terminal 12 in the network is provided with suitable input and output devices, including an operator display 18, a numerical keypad 20, a bar code scanner 22, and a printer 24. The operator display 18 may comprise a standard PC monitor, a touch screen or a DynaKey™ display. The present embodiment of the POS performance motivator 10 is designed for use in conjunction with a general POS software application. As shown in FIG. 1, the general POS application has a front end 26 that is run on the POS terminals 12 to provide outputs to, and receive inputs from, the cashiers operating the terminals. The general POS application also has a back end 28 that is run on the central server computer 14. The back end 28 of the general POS application is used to manage POS data 30 that is stored in a database, or databases, that may be located on the network server computer or on a data server. Typical POS data 30 may include product information, pricing information, bar code information, and the like. Also included under the general heading of POS data 30 in FIG. 1 are other types of data needed to administer the POS system, including data identifying each cashier, security information, such as passwords, customer information, and the like.

As shown in FIG. 1, the POS system includes an administrator terminal 32 that may be connected directly to the server computer 14 or may be connected to the server computer 14 through a network. The administrator terminal 32 is typically implemented in the form of a PC or workstation that includes a display 34, a keyboard and mouse 36, and a printer 38. The administrator terminal 32 is operated by a system administrator, who monitors the system, performs maintenance and update functions, and generates reports.

As shown in FIG. 1, the POS motivator includes a front end 40 that is run on each POS terminal and a back end 42 that is run on the network server computer 14. The front end 40 of the POS motivator provides feedback to the cashier at each terminal 12. The back end 42 is used to set up the individual cashier goals and incentives. The back end 42 of the POS motivator is provided with access to an electronic database 44 to keep track of the performance of individual cashiers using the system. In the present embodiment of the POS motivator system 10, the POS motivator is integrated with the general POS application in order to capture transaction data.

As described in greater detail below, the POS performance motivator can be tailored to monitor different performance objectives. For example, in food POS applications, a performance goal may be formulated to monitor the amount of time required to process a given number of purchased items, or the amount of time required to scan individual items. In a hospitality POS application, a performance goal may be formulated to monitor the average amount of guest checks. In more general merchandising POS applications, the goals may be formulated to monitor total sales per cashier.

As mentioned above, the back end 42 of the POS performance motivator is used to set up employee goals. In particular, using the back end of the POS performance motivator, a manager can select a suitable measure for cashier performance, and then set a target goal for each cashier using the POS terminals 12 in the network. In the present embodiment of the invention, the POS performance motivator uses data that is tracked and reported on by a general POS software application. However, it would also be possible to construct a stand-alone version of the POS performance motivator.

The measure for cashier performance may vary from industry to industry. In the food industry, the measure for cashier performance may include scan rates, that is, the number of items scanned per minute or other unit time, and the number of double scans. In a general merchandise industry, the measure for cashier performance may include total sales per day, or the number of a specific product sold per day or week. This second measure of performance may be suitable, for example, in the cosmetics area, particularly when the retail establishment has special incentive programs to promote a special offer. In the hospitality industry, the measure for cashier performance may include the amount of the average guest check, the number of desserts sold, or the number of specials sold.

Figure 2:
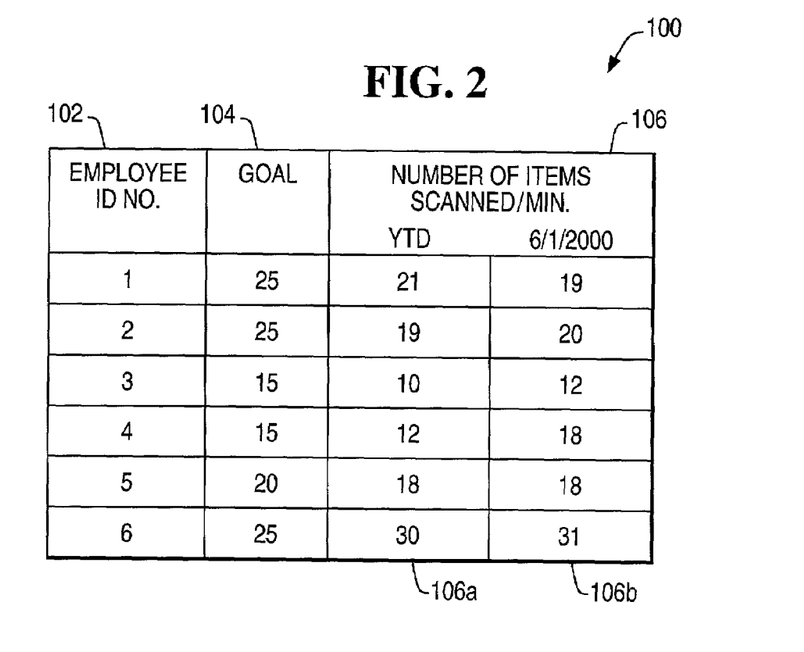
FIG. 2 shows a table setting forth performance goals according to the present invention.

FIG. 2 shows a table 100 setting forth performance goals for individual employees. The first column 102 lists the employees using identification numbers. For purposes of illustration, the numbers 1-6 are used. However, it should be noted that retail stores using networked POS systems typically already assign a number or name to each cashier for identification purposes. These same numbers or names can be used in conjunction with the present invention.

As indicated by the heading 106 of the third and fourth columns 106a and 106b, the performance criterion selected for monitoring in FIG. 2 is the number of items scanned per minute. As mentioned above, other performance criteria may be used. In the second column 104, a goal is assigned for each individual employee. The goal will typically be selected based upon historical performance data. However, other criteria may be used. The third column 106a displays in read-only form the employee's year to date (YTD) average, and the fourth column 106b displays in read-only form the employees performance for a recently completed work session. The figures in the third and fourth columns can be used both as a review of an employee's past performance and also as a guide to setting current performance goals.

The POS performance motivator is integrated with the POS terminal software, such that each scanned item is counted in real time. Thus, at the end of the work session, when an employee logs off of a POS terminal, the scan rate can be readily computed by dividing the number of scanned items by the number of minutes worked by the cashier.

Figure 3:
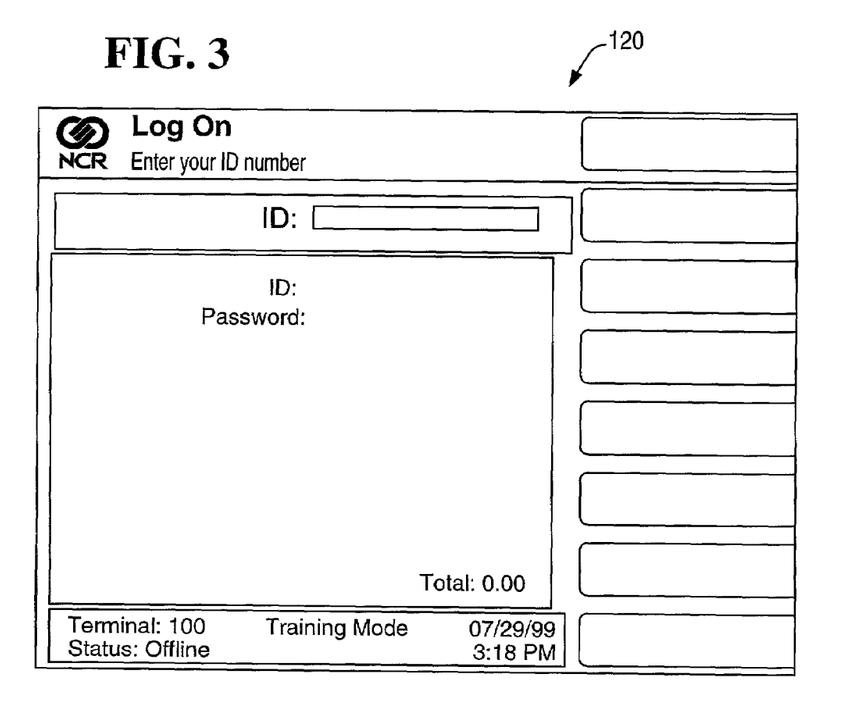
FIG. 3 shows a screenshot of a logon screen according to the present invention.

An employee typically logs onto a POS terminal by entering an identifying name or number and a password. The logon function may be implemented using the general POS software application. FIG. 3 shows a screenshot of a logon screen 120 suitable for use with the present embodiment of the POS motivator. The cashier enters an ID number by making the appropriate keystrokes on the POS terminal's numerical keypad. After the ID number has been entered, the cashier strikes the "Enter" key on the keypad and then, when prompted, enters his or her numerical password, again using the keypad.

Figure 4:
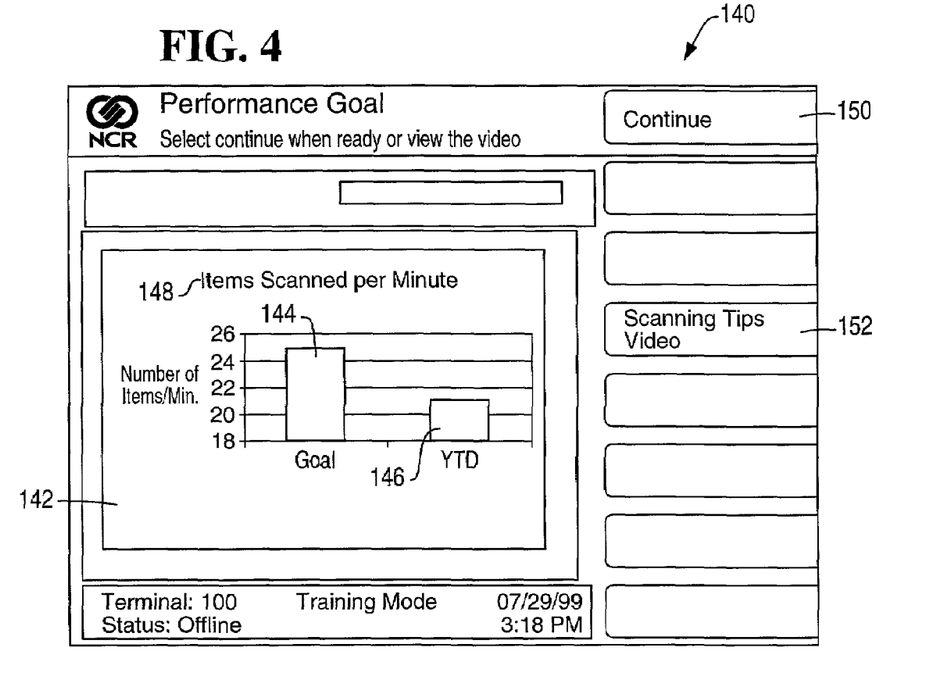
FIG. 4 shows a screenshot of a performance goal screen according to the present invention.

If the employee's ID and password have been accepted, the POS motivator displays a performance goal screen to the employee at the POS terminal display. FIG. 4 shows a screenshot of a performance goal screen 140 suitable for use in the present embodiment of the POS motivator system. The employee's performance goal is communicated to the employee in the form of a graphical display 142. In the FIG. 4 embodiment of the POS motivator system, the performance goal is displayed in the form of a bar graph, in which the current goal 144 is displayed next to the employees YTD average measured performance 146. In addition, the particular performance criterion being monitored appears as text 148 at the top of the graphical display 142. The performance goal screen may also contain a motivational message or video clip. Employers may also advertise performance incentives on this screen.

FIG. 4 shows a performance goal of 25 items scanned per minute, and a YTD average of 21 items scanned per minute. Thus, the cashier is made aware of the need to increase his or her scanning speed in order to achieve the performance goal. Other displays may be used to provide motivation. For example, the display can be numerical, rather than graphical. In addition, the display can show performance levels for different time periods, as well as store averages and the like. The display can also be integrated with an employee bonus system. For example, the cashier may earn points towards a bonus by achieving or exceeding performance goals. The cashier's point levels can be incorporated into the display.

According to the present embodiment of the invention, once the cashier has had an opportunity to review the performance goal screen, the cashier enters an input into the POS terminal that causes the performance goal screen to be replaced with a suitable screen from the POS application. The POS motivator system can be designed, for example, such that the cashier input takes the form of a keystroke on a numerical keypad or on a full PC keyboard. If the POS system is provided with a touchscreen display, the cashier input can be made by touching a suitable region on the screen.

The performance goal screen 140 shown in FIG. 4 has been implemented for use with a DynaKey™ display. The performance goals screen 140 includes two DynaKeys™ 150 and 152 that are actuated by finger pressure. The DynaKey™ labeled "Continue" 150 is pressed after the cashier has had an opportunity to review the information contained in the performance goal screen. Pressing the continue DynaKey™ 150 causes the main screen of the general POS application to be brought up on the display, allowing the cashier to begin the work session.

The DynaKey™ labeled "Scanning Tips Video" is pressed if the cashier wishes to view an instructional video appropriate to the performance measure. In a further embodiment, the "Scanning Tips Video" DynaKey™ 152 may be used to access other information, such as a help page or other graphics.

The POS motivator system tracks measurements, as set up in the back office application, while the system is being used by the cashier. This monitoring activity proceeds in parallel with the normal operations of the general POS application, such that during a typical work session, the POS motivator is invisible to the cashier. In a further embodiment of the invention, the employee is provided with access to the POS motivator during the work session to receive feedback as to their performance up to that point. It would also be possible to provide the cashier with performance information on an ongoing basis.

The cashier signs off of the POS terminal at the end of his or her shift, using the sign off protocol of the general POS application. The POS motivator system is integrated with the general POS application such that performing the sign off function causes the POS motivator to display a performance report screen at the POS terminal.

Figure 5:
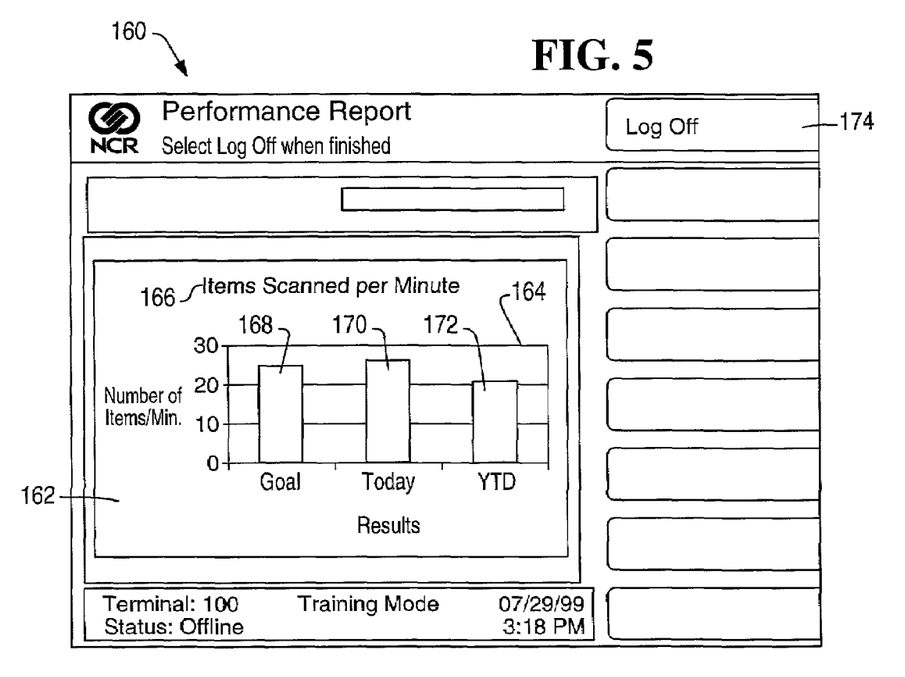
FIG. 5 shows a screenshot of a performance report screen according to the present invention.

FIG. 5 shows a screenshot of a performance report screen 160 according to the present invention. The performance report screen includes a display that includes a bar graph illustrating the cashier's measured performance for the work session that has just been completed. At the top of the graph is a text description 164 of the measured, quantity. The first bar 168 in the graph shows the present goal for the work session which in the present example is 25 items scanned per minute. The second bar 170 shows the measured results for the work session, which in the present example is approximately 26 items scanned per minute. Thus, by a quick visual comparison of the heights of the first bar 168 and the second bar 170, the cashier can immediately ascertain whether the session's goals have been met. The third bar 172 of the graph shows the cashier's YTD average, which in the present example is approximately 21 items scanned per minute. This allows the worker to evaluate his or her past performance, and also to determine whether the work session that has just been completed has been above or below average.

Once the cashier has completed his or her review of the performance report screen 160, the cashier logs off from the POS motivator system by pressing the DynaKey™ labeled "Log Off" 174.

Figure 6:
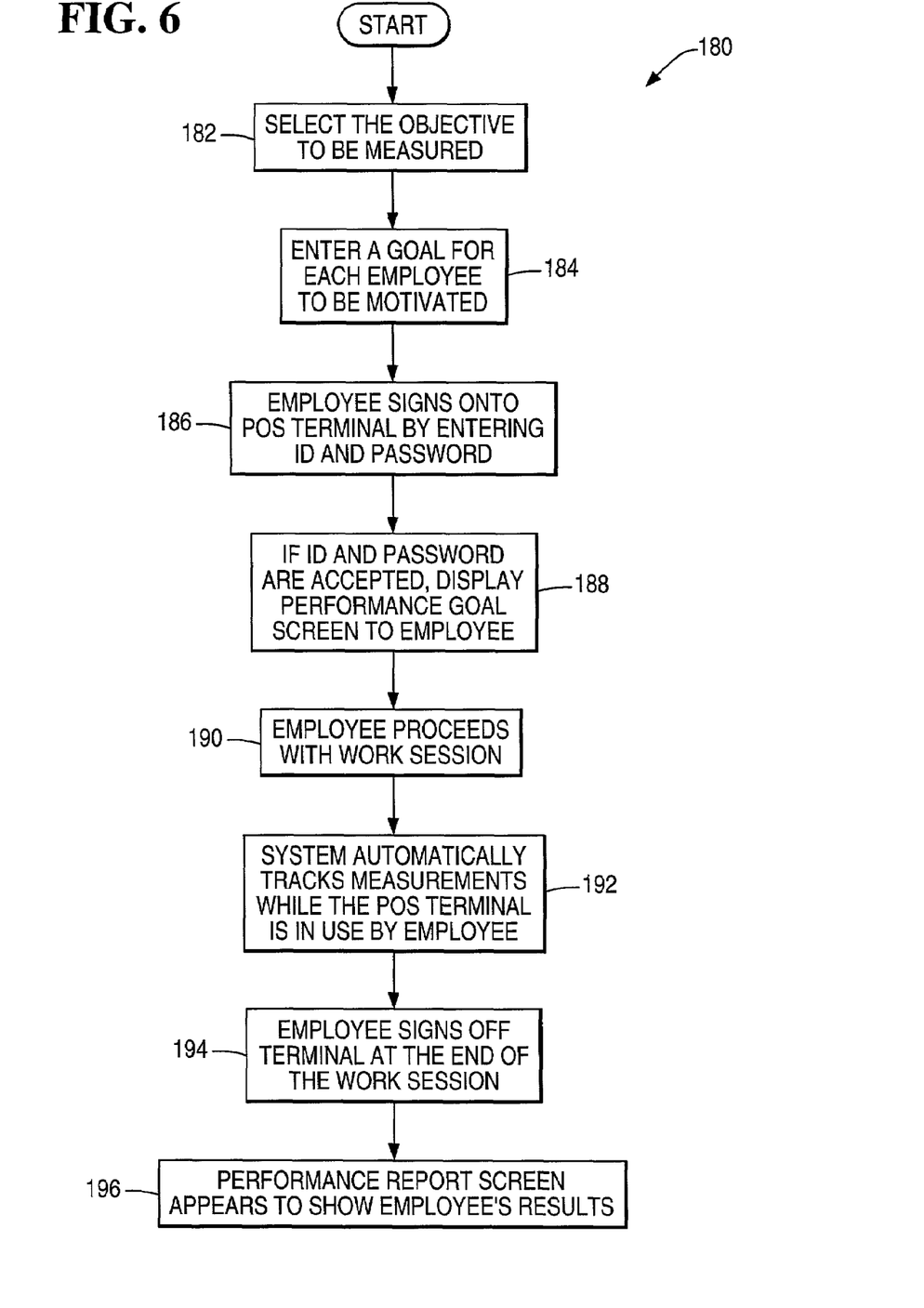
FIG. 6 shows a flowchart of a method for motivating cashiers using networked POS terminals according to a further aspect of the present invention.

FIG. 6 shows a flowchart of a method 180 according to the present invention for motivating a cashier at a POS terminal according to the present invention. In step 182, the objective to be measured is selected from a list of possible goals. As described above, the objective is chosen to suit the particular retail environment in which the POS terminals are being operated. In step 182, a goal is entered into the POS motivator system for each employee. Steps 182 and 184 are performed at the back end 42 of the POS motivator system by a manager or system administrator. In step 186, a cashier logs onto a POS terminal at the start of a work session by entering an identifier and password. In step 188, if the identifier and password have been accepted, the POS terminal displays to the cashier a performance goal screen, showing the cashier the performance goal for the work session. In step 190, the employee proceeds with the work session. In step 192, the POS motivator system automatically tracks performance measurements while the POS terminal is in use by the cashier. In step 194, at the end of the work session, the employee signs off of the POS terminal. In step 196, as part of the signoff process, the POS terminal displays a performance report screen to the cashier, showing the results of the work session that has just been completed.

Figure 7:
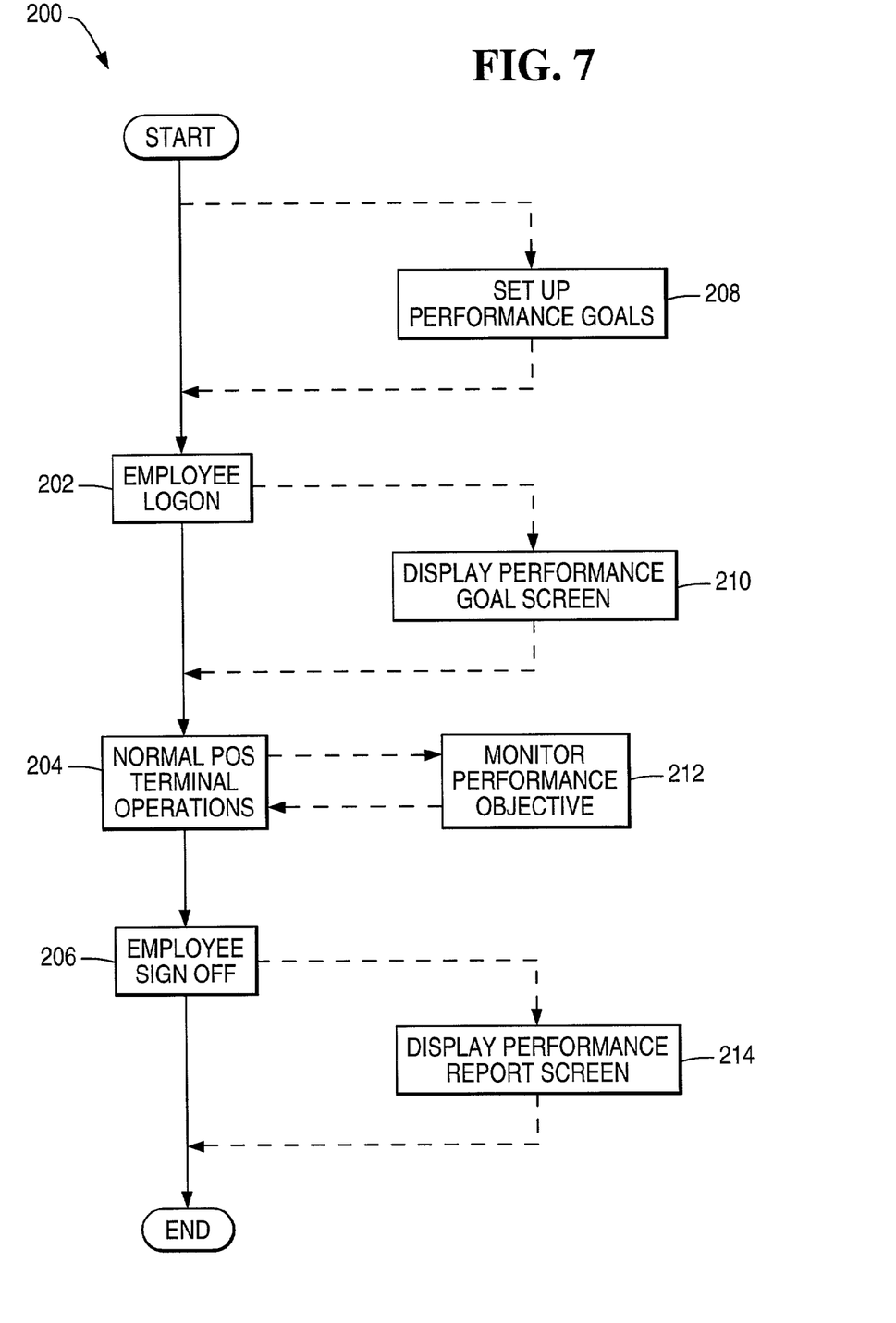
FIG. 7 shows a flowchart illustrating the integration of a POS performance motivator system into an already existing general POS software application.

From the above description, it will be appreciated that a POS motivator can be readily added to an already existing general POS software application. FIG. 7 shows a flowchart 200 illustrating this feature of the invention. The operations of the general POS software application include employee logon 202, normal POS operations 204, and employee sign off 206. These functions remain intact in the POS performance motivator system.

As illustrated in FIG. 7, the existing system is modified, first, by setting up performance goals in step 208. After employee logon 202, the operations of the general POS software application are momentarily interrupted by displaying a performance goal screen 210. Normal operation resumes in step 204 after the cashier has pressed the continue DynaKey™ on the touchscreen display. While step 204 is being performed, the POS motivator system works in tandem with the general POS software application in step 212 to monitor the performance objective. Finally, a performance report screen 214 is integrated into the employee sign off process commenced in step 206.

While the foregoing description includes details which will enable those skilled in the art to practice the invention, it should be recognized that the description is illustrative in nature and that many modifications and variations thereof will be apparent to those skilled in the art having the benefit of these teachings. It is accordingly intended that the invention herein be defined solely by the claims appended hereto and that the claims be interpreted as broadly as permitted by the prior art.

I claim:

1. A point of sale (POS) terminal for providing feedback to a cashier operating the POS terminal, the POS terminal comprising:

a display for displaying information to the cashier operating the POS terminal, the display displaying a performance goal screen at the start of a work session to indicate to the cashier a performance goal for the work session, the work session beginning at the time the cashier logs onto the POS terminal and ending at the time the cashier logs off the POS terminal; and the POS terminal operating to measure the cashier's performance of tasks during the work session, the tasks comprising the number of items scanned per unit time, the display displaying at the end of the work session a performance report screen including the cashier's measured performance and the performance goal to provide performance feedback directly to the cashier.

2. The system of claim 1, wherein the performance goal displayed to the cashier on the performance goal screen is set for each individual cashier using the POS terminal.

3. The system of claim 2, wherein the performance goal is determined using historical performance data for each individual cashier.

4. The system of claim 1, wherein the POS terminal rims a general POS application, and wherein the performance goal screen and the performance report screen are integrated into the operation of the general POS application.

5. The system of claim 4, wherein the performance goal screen is displayed to the cashier when the cashier logs into the general POS application.

6. The system of claim 5, wherein the POS terminal returns to the general POS application from the performance goal screen upon receiving an input from the cashier.

7. The system of claim 6, wherein the performance goal screen in provided with an on-screen button that, when actuated, returns the POS terminal to the general POS application.

8. The system of claim 4, wherein the performance report screen is displayed to the cashier when the cashier logs out of the general POS application.

9. The system of claim 1, wherein the POS terminal is connected into a network, the performance goal screen and performance report screen being generated by a POS motivator software application including a front end that is run on each POS terminal in the network and a back end that is run on a central sewer computer in the network, the back end of the POS motivator software application being used to set up performance goals for each cashier using a POS terminal in the network.

10. The system of claim 9, wherein the network includes an administrator terminal operated by a system administrator who sets the performance goals for each cashier using a POS terminal in the network.

11. A method for providing feedback to a cashier a POS terminal, comprising:

displaying a performance goal screen at the start of a work session, indicating to the cashier a performance goal for the work session, the work session beginning at the time the cashier logs onto the POS terminal and ending at the time the cashier logs off the POS terminal;

measuring the cashier's performance of tasks during the work session, the tasks comprising the number of items scanned per unit time; and displaying at the end of the work session a performance report screen including the cashier's measured performance and the performance goal to provide performance feedback directly to the cashier.

12. The method of claim 11, further including:

setting a performance goal screen for each individual cashier using the POS terminal.

13. The method of claim 12, further including:

determining the performance goal for each individual cashier using historical performance data for each individual cashier.

14. The method of claim 11, further including:

integrating the performance goal screen and the performance report screen into the operation of a general POS application rim by the POS terminal.

15. The method of claim 14, wherein the step of displaying the performance goal screen to the cashier is performed when the cashier logs into the general POS application.

16. The method of claim 14, wherein the step of displaying the performance report screen to the cashier is performed when the cashier logs out of the general POS application.

17. The method of claim 11, further including:

connecting the POS terminal into a network, the performance goal screen and performance report screen being generated by a POS motivator software application including a front end that is run on each POS terminal in the network and a back end that is run on a central server computer in the network, the back end of the POS motivator software application being used to set up performance goals for each cashier using a POS terminal in the network.

18. The method of claim 17, further including:

using an administrator terminal to set the performance goals for each cashier using a POS terminal in the network.

* * * * *